United States Patent [19]

Youngers et al.

[11] 4,027,913
[45] June 7, 1977

[54] FRAME STRUCTURE FOR ARTICULATED VEHICLE

[75] Inventors: Steve A. Youngers, Clearwater; Terry D. Erickson, Wichita, both of Kans.

[73] Assignee: J. I. Case Company, Racine, Wis.

[22] Filed: Dec. 8, 1975

[21] Appl. No.: 638,944

[52] U.S. Cl. .......................... 296/28 J; 280/106 T
[51] Int. Cl.² ....................................... B62D 23/00
[58] Field of Search ............. 296/28 R, 28 F, 28 J; 280/106 R, 106 T; 180/134, 135, 136, 137, 138, 139

[56] References Cited
UNITED STATES PATENTS

| 2,719,044 | 9/1955 | Walter | 280/106 R |
| 3,328,049 | 6/1967 | Luterbach | 280/106 R |
| 3,738,442 | 6/1973 | Gottwald | 280/106 R |
| 3,850,473 | 11/1974 | Huber | 296/28 |

Primary Examiner—Joseph F. Peters, Jr.
Assistant Examiner—R. Schrecengost
Attorney, Agent, or Firm—Dressler, Goldsmith, Clement, Gordon & Shore, Ltd.

[57] ABSTRACT

An articulated vehicle consisting of pivotally interconnected rear and front sections is disclosed herein. The bodies defining both sections of the articulated vehicle each include a pair of fenders that are formed from sheet metal and are interconnected by bracing members to define spaces therebetween. The rear section has a pivot cover member which encloses the space to define an enclosed compartment while the front section also has a cover extending above the respective fenders to define an enclosed compartment for an engine space.

7 Claims, 6 Drawing Figures

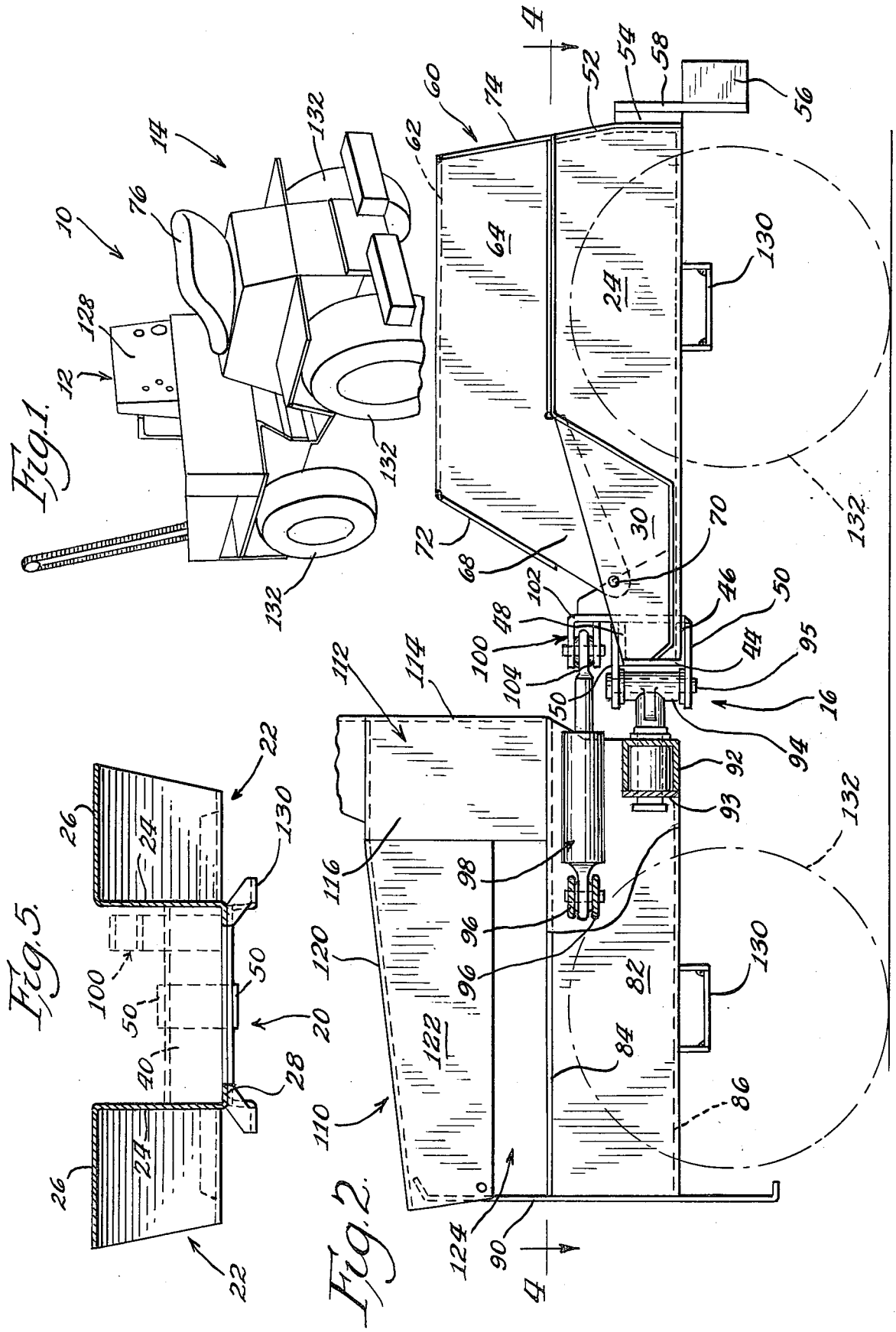

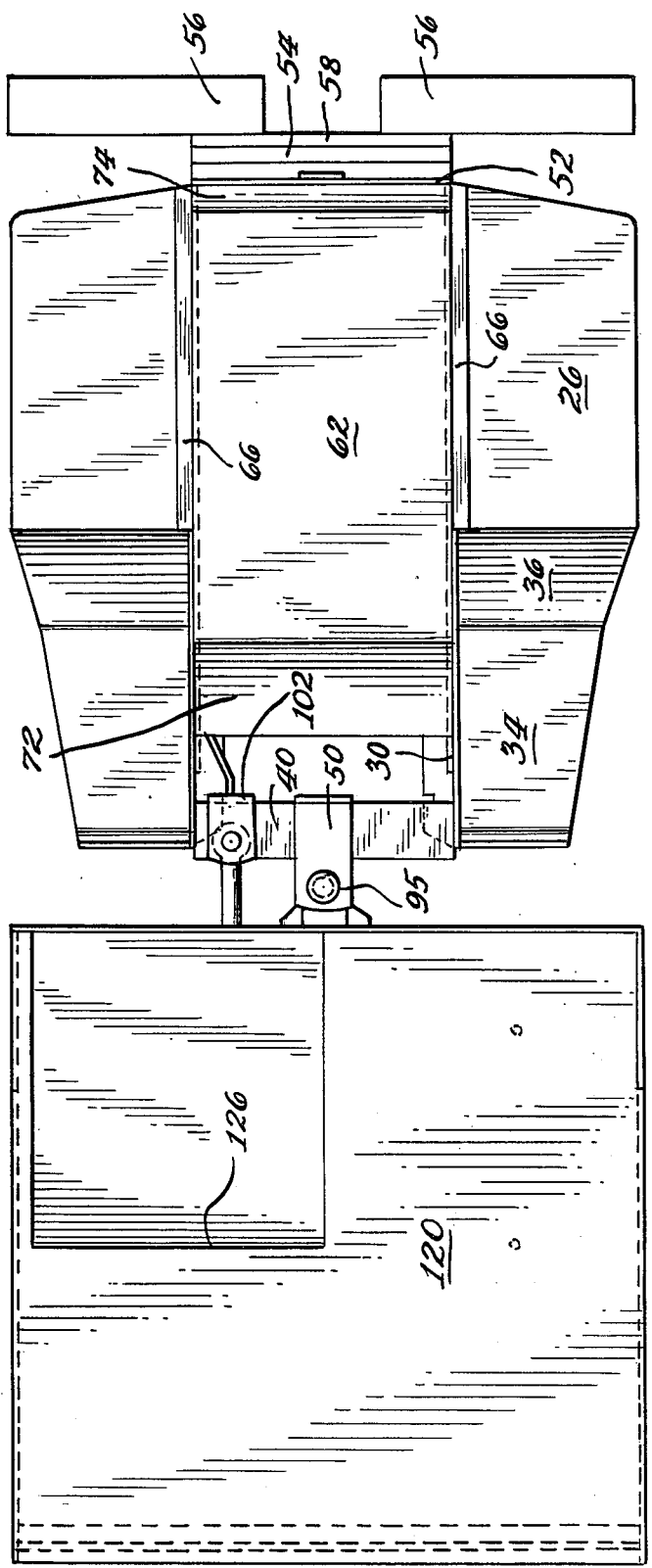
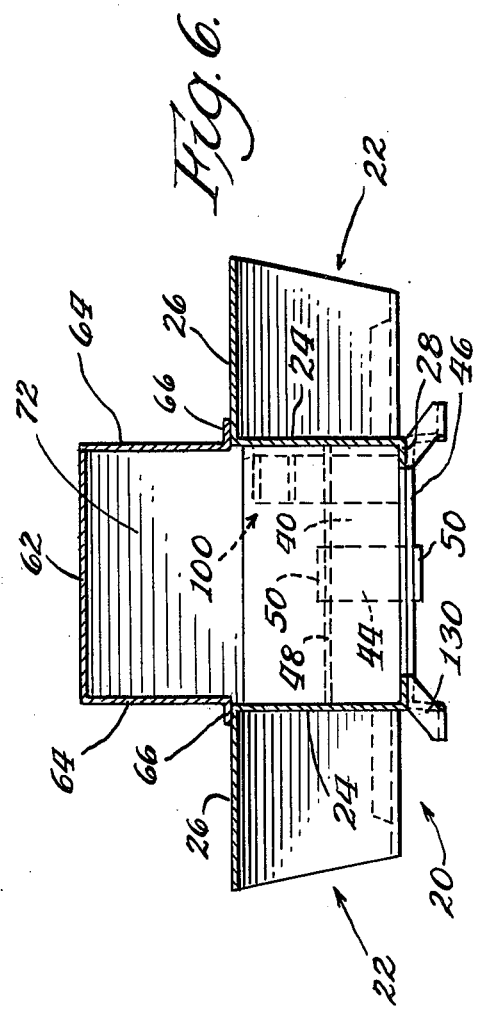

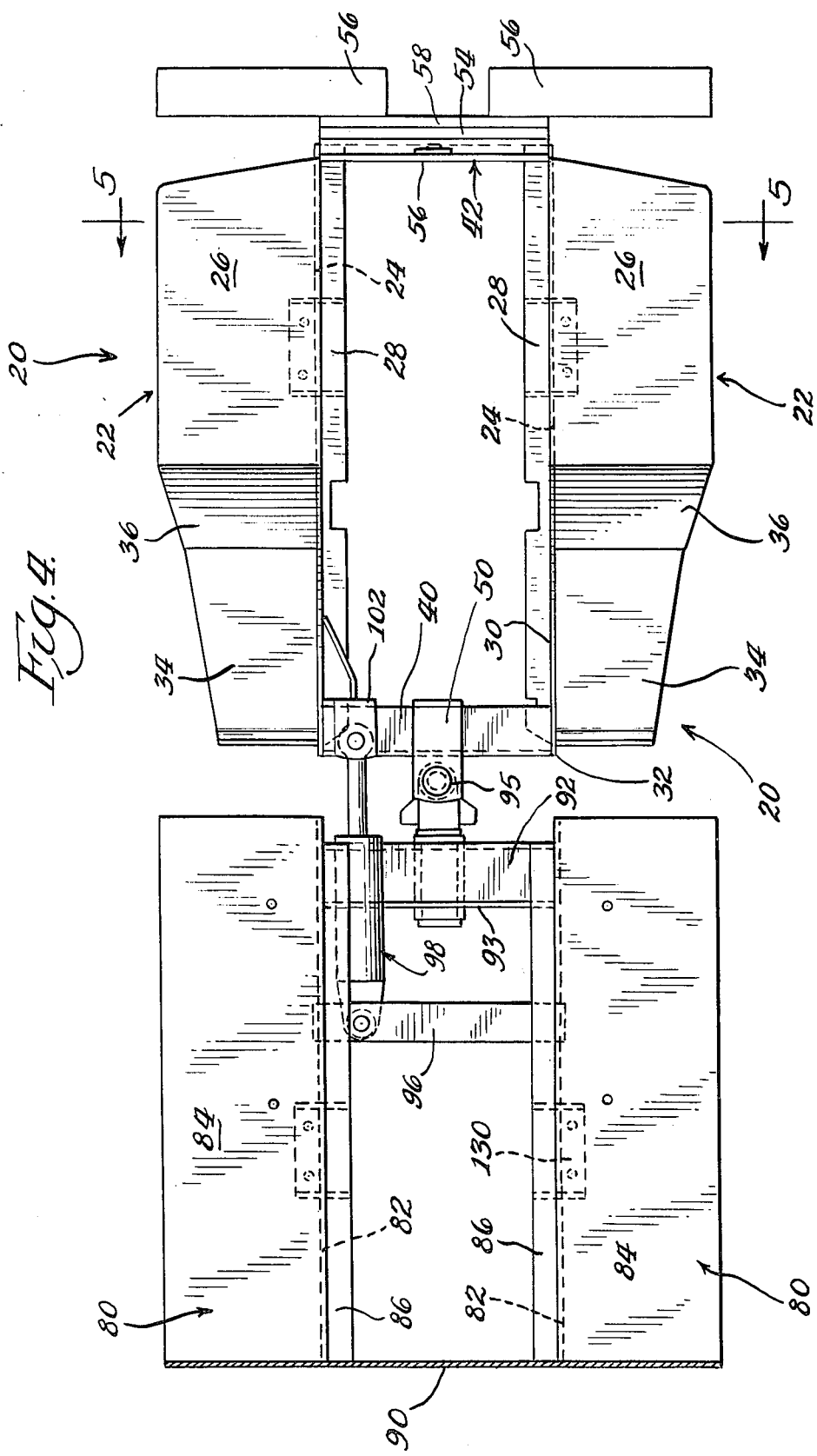

FRAME STRUCTURE FOR ARTICULATED VEHICLE

BACKGROUND OF THE INVENTION

The present invention relates to the vehicles, particularly the articulated type, that are utilized for performing various functions.

Articulated vehicles have been known for many years and for some time were usually restricted to large heavy-duty construction equipment. Recently, smaller articulated vehicles have been developed for use in restricted areas. One of these uses relates to the field of trenching. Since many of the trenching operations are performed in restricted areas, the size, weight and manuverability of the vehicle becomes extremely important.

As will be appreciated, the size and the weight of the various components that form the frame structure are extremely important in manufacturing a unit that will be acceptable to the industry.

SUMMARY OF THE INVENTION

The present invention contemplates a frame structure for an articulated vehicle that can be used for performing various earthworking functions, such as trenching operations. The frame structure is formed of readily available metal pieces that can be interconnected by welding to produce a rigid frame.

More specifically, the articulated vehicle of the present invention includes a forward frame section and a rear frame section that are pivotally interconnected to accommodate pivotal movement about a vertical axis. The rear frame section consists of a pair of fenders, each of which is formed by deforming plates to define the major portion of the rear section. The two fenders are transversely spaced from each other and are interconnected by braces to define a compartment which is completely enclosed by a cover member that is pivotally connected to the fenders.

The forward frame section also is produced by a pair of fenders that are respectively formed from individual plates and interconnected by bracing members to produce a compartment. Again, the compartment is enclosed by a cover that extends above the forward fenders.

BRIEF DESCRIPTION OF THE SEVERAL VIEWS OF THE DRAWINGS

FIG. 1 shows a perspective view of an articulated vehicle having a frame structure constructed in accordance with the teachings of the present invention;

FIG. 2 shows a side elevation, partly in section of the vehicle shown in FIG. 1;

FIG. 3 shows a plan view of the vehicle shown in FIG. 2;

FIG. 4 is a view similar to FIG. 3 showing the lower portion of the frame structure with the cover members deleted;

FIG. 5 is a vertical section as viewed along line 5—5 of FIG. 4 with the cover member removed; and FIG. 6 is a view similar to FIG. 5 showing the cover member on the rear section.

DETAILED DESCRIPTION

While this invention is susceptible of embodiment in many different forms, there is shown in the drawings and will herein be described in detail a preferred embodiment of the invention with the understanding that the present disclosure is to be considered as an exemplification of the principles of the invention and is not intended to limit the invention to the embodiment illustrated.

FIG. 1 of the drawings shows an articulated vehicle, generally designated by the reference numeral 10 and constructed in accordance with the teachings of the present invention. Articulated vehicle 10 has a forward frame section 12 and a rear frame section 14 that are pivotally interconnected by a pivotal connection (FIG. 2) 16 which will be described later.

According to the present invention, both frame sections 12 and 14 are produced from readily available sheet metal that is deformed in a specific manner and interconnected by welding to result in an extremely rigid unit which can be manufactured at a substantial reduction in cost. The entire vehicle can be produced with a minimum amount of machining that is normally required for producing such structures.

Referring to FIGS. 4 and 5, rear frame section consists of a lower portion 20 that is produced by a pair of fenders 22 each of which is produced from a sheet metal piece that is deformed in a specific manner. More specifically, fenders 22, which are mirror images of each other, each include a single plate that is deformed to produce a vertical plate portion 24 at the rear end of the frame section as well as an integral horizontal plate portion 26 extending from the upper edge of the vertical plate portion. The lower edge of vertical plate portion 24 also has a horizontally directed flange 28 that extends in the opposite direction from upper plate portion 26. Thus, the rear portion of each fender is generally z-shaped in cross section.

Each fender 22 also has a forward portion that consists of an integral vertical forward extension 30 of vertical wall portion 24 and terminates in a forward edge 32 defining the front end of the rear section. Each forward portion of the respective fenders 22 also has an outwardly directed ledge 34 extending from the lower edge of vertical extension 30 adjacent forward edge 32. Ledge 34 and horizontal portion 26 are interconnected by a downwardly and forwardly inclined wall portion 36 that is integral at the upper rear edge with horizontal plate portion 26 and integral at the lower forward edge with ledge 34.

Each fender 22 can be produced from a single sheet of sheet metal that can be bent at selected locations to the configuration illustrated in FIGS. 4 and 5. Ledge 34 and inclined wall portion 36 can then be secured to extension 30 by welding to produce an extremely rigid structure.

Each of the fenders is then positioned to have the vertical wall portions 24 transversely spaced from each other and extending parallel to each other. The respective fenders 22 are then interconnected by braces 40 and 42 that are respectively located at the forward and rear ends of the fenders. As most clearly illustrated in FIG. 2, forward brace 40 consists of a channel that is generally U-shaped in cross section with its web portion 44 extending vertically across the forward edges 32 of extension 30 and a lower leg 46 extending rearwardly below flanges 28. The upper leg 48 extends inwardly between extensions 30. Thus, U-shaped channel 40 can be welded to inwardly directed flanges 28 as well as to extensions 30. A pair of plates 50 can then be welded to the upper and lower leg 46 and 48 and extend forwardly of channel 40 to define a clevis which forms part of the pivotal interconnection between the two frame sections.

Rear interconnecting brace 42 is most clearly illustrated in FIGS. 2 and 3 and consist of a plate 52 that extends across rear edges of vertical plate portions 24 and is secured thereto by welding. A further reinforcing plate 54 (FIG. 2) May be welded or bolted to cover plate 52 and also have suitable counterweights 56 secured thereto by support plate 58. Alternatively, members 56 may be formed as compartments for housing hydraulic fluid for operating the various components that form part of vehicle 10.

Rear frame section 14 also has a cover member 60 cooperating with fenders 22 to define an enclosed compartment. More specifically, cover member 60 (FIGS. 2 and 6) includes a top horizontal wall 62 and a pair of depending vertical walls 64 that are integral with opposite lateral edges of horizontal wall 62. The lower ends of depending walls 64 have outwardly directed flanges 66. Depending vertical walls 64 also have forward ends 68 (FIG. 2) that extend parallel to forward extensions 30 in contiguous relation therewith and are pivotally supported thereon by pivot pins 70. Thus, the entire cover member 60 can be pivoted about pivot pin 70 to gain access to the enclosed compartment defined in the rear frame section 14.

To complete the cover assembly, upper horizontal wall 62 also has an integral forward extension 72 that is inclined downwardly and extends across the upper edges of forward ends 68. Likewise, the rear end of horizontal top wall 62 has an integral extension 74 that extends downwardly across the rear edges of depending walls 64 and terminates adjacent the lower edges thereof. The cover 60 has an operator's seat 76 (FIG. 1) supported on top wall 62.

An inspection of FIG. 6 shows that in the closed position, cover 60 has its outwardly directed flanges 66 resting directly on the upper surfaces of horizontal wall portions 26 to define a completely enclosed compartment.

Forward frame section 12 is most clearly illustrated in FIGS. 2 and 4 and consists of first and second or left and right fenders 80 that are again substantial mirror images of each other. Each fender 80 is produced by deforming a plate to produce a vertical segment 82, having an outwardly directed first horizontal segment 84 integral with the upper edge of vertical segment 82 and an inwardly directed second horizontal segment 86 integral with the lower edge of vertical segment 82. The two fenders 80 are then positioned to have the vertical segments 82 transversely spaced from each other and extending parallel to each other and interconnected by brace means that will now be described. The brace means for the forward section 14 consists of a vertical plate 90 that extends across the forward ends of fenders 80 and terminates at outer edges that are substantially aligned with the outer edges of upper horizontal segments 84. As most clearly illustrated in FIG. 2, plate 90 has a lower portion that extends below lower segments 86 of fenders 80 and an upper portion that extends above upper horizontal segments 84 and plate 90 is welded to the front edges of the respective fenders.

The rear interconnecting brace between fenders 80 consists of a U-shaped channel 92 that is closed at its forward end by a plate 93, both of which are welded to each other and have their outer ends welded to vertical segments 82 as well as horizontal segments 86. Rear connecting brace consisting of U-shaped channel 92 and plate 93 has a socket 94 supported thereon which receives a pivot pin 95 that extends through openings in plates 50 to define the pivotal connection between forward and rear sections 12 and 14. A further pair of plates 96 extend between vertical segments 82 and are welded thereto. These plates support one end of a fluid ram 98 that has its opposite end connected to a bracket 100 supported on rear section 14, more specifically U-shaped channel brace 40. Bracket 100 consists of an L-shaped plate 102 having one leg welded to legs 46, 48 with a plate 104 welded to plate 102 and extending parallel to the other leg. Preferably, a gusset plate 106 (FIG. 4) is welded to flange 28 and plate 102 to reinforce bracket 100. Fluid ram 98 is laterally offset from pivot pin 95 and therefore can be utilized for articulating the frame sections relative to each other about pivot pin 95.

Forward section 12 also has a cover 110 that extends above horizontal segments 84 to define an enclosed forward space. Cover 110 consists of a first substantially U-shaped plate portion 112 that has a vertical web 114 that defines the rear end of the enclosed forward space. U-shaped plate 112 also has a pair of forwardly directed legs 116 that are vertically aligned with the outer edges of horizontal segments 84 and web 114 and legs 116 are welded to the respective horizontal segments 84. Thus, U-shaped plate 112 defines the rear end of the enclosed compartment.

Cover 110 also includes a second substantially U-shaped plate that has an upper generally horizontal wall 120 which extends forwardly from web 114 beyond vertical plate 90 to define the upper surface for cover 110. Upper horizontal wall 120 has a pair of depending flanges 122 that have their rear ends vertically aligned with legs 116 and their forward ends extending beyond the outer edges of vertical plate 90. These depending legs 122 terminate at a location above horizontal segments 84 to define an open space 124. The front and rear ends of horizontal wall 120 are respectively welded to plate 90 and web 114 while the front and rear ends of flanges 122 are respectively welded to plate 90 and legs 116.

Thus, the enclosed space defined between fenders 80 and cover 110 can be utilized as the engine compartment for the vehicle. An opening 126 may be provided in top cover plate 120 so that a portion of the engine may be exposed to the atmosphere. This opening 126 may be surrounded at the rear end by a deflector plate 128 (FIG. 1) to deflect the heat and noise from the engine located within the forward space.

The forward and rear sections both have a pair of brackets 130 secured to the respective lower inwardly directed flanges 28 and lower horizontal segments 86. These brackets are utilized for connecting front and rear axles to the respective frame sections with the axles (not shown) having wheels 132 supported on opposite ends thereof.

As can be appreciated from the above description, the present invention provides a simple and unique arrangement for producing very rigid frame sections for an articulated vehicle. All of this is accomplished without the necessity of a significant amount of welding, machining or the drilling of holes. In fact, the entire assembly, with the exception of pivot pins 70 and the articulated interconnection can be produced by welding sheet metal parts without the use of any bolts or other accessories.

When the two frame sections are welded together and interconnected as illustrated in FIG. 2, the forward section, particularly the area below the upper wall 20 is utilized for housing an engine and other components. The rear section defines the operator's compartment for the vehicle and ledges 34 act as foot supports for the operator seated on seat 76. The enclosed compartment defined between cover 60 and fenders 22 can be utilized for housing some of the vehicle components as well as acting as a storage compartment for the vehicle.

What is claimed is:

1. In an articulated vehicle having a forward frame section and a rear frame section with a pivotal connection between said sections accommodating relative pivotal movement of said sections about a vertical pivot axis, said rear frame section including first and second transversely spaced fenders, each of said fenders having a forward portion and a rear portion, each of said rear portions including a vertical plate portion and a horizontal plate portion integral with an upper edge of said vertical plate portion and extending outwardly therefrom, brace means respectively interconnecting said forward and rear portions of said first and second fenders, and a cover member cooperating with said fenders to define an enclosed compartment, said cover member including a top horizontal wall and a pair of transversely spaced depending walls on opposed edges of said horizontal wall, said dependent walls being respectively substantially vertically aligned with the respective vertical plate portions of said fenders, said depending walls respectively having outwardly directed flanges on lower edges thereof with said outwardly directed flanges respectively supported on the respective horizontal plate portions.

2. An articulated vehicle as defined in claim 1, in which said forward portion of each fender has a vertical forward extension integral with said vertical plate portion and in which said transversely depending walls have forward ends extending parallel to said forward portions with pivot means interconnecting respective integral extensions and forward ends so that said cover member may be pivoted to open said enclosed compartment.

3. An articulated vehicle as defined in claim 2, in which said forward portion of each fender has a horizontal outwardly directed ledge extending from a horizontal lower edge of said vertical forward extension and a downwardly and forwardly inclined wall portion integral with said horizontal plate portion at a rear end thereof and integral with the ledge at the forward end thereof.

4. An articulated vehicle as defined in claim 3, in which said top horizontal wall of said cover member has an integral forward extension inclined downwardly and forwardly and extending across upper edges of said forward ends.

5. An articulated vehicle as defined in claim 4, in which said cover member has a substantially vertical rear wall portion integral with a rear end of said top horizontal wall, said vertical rear wall enclosing an open area between the rear ends of said depending walls.

6. An articulated vehicle as defined in claim 5, further including a seat supported on said top horizontal wall.

7. An articulated vehicle as defined in claim 1, in which said forward frame section includes left and right hand transversely spaced forward fenders; each forward fender having a vertical segment, an outwardly directed first horizontal segment at an upper edge of said vertical segment and an inwardly directed second horizontal segment at a lower edge of said vertical segment, said vertical segments being transversely spaced and extending substantially parallel to each other; interconnecting means interconnecting rear ends of said forward fenders, said interconnecting means including a front vertical plate extending across forward ends of said front fenders and above said first horizontal segments; a brace extending between said vertical segments at rear ends; and a cover extending above said first horizontal segments to define an enclosed forward space.

* * * * *